(12) United States Patent
Tormasov et al.

(10) Patent No.: US 7,353,355 B1
(45) Date of Patent: Apr. 1, 2008

(54) SYSTEM AND METHOD FOR RAPID RESTORATION OF SERVER FROM BACKUP

(75) Inventors: Alexander G. Tormasov, Moscow (RU); Serguei M. Beloussov, Herndon, VA (US); Maxim V. Tsypliaev, Moscow (RU); Maxim V. Lyadvinsky, Moscow (RU)

(73) Assignee: Acronis Inc., Tortola (VG)

( * ) Notice: Subject to any disclaimer, the term of this patent is extended or adjusted under 35 U.S.C. 154(b) by 512 days.

(21) Appl. No.: 11/022,887

(22) Filed: Dec. 28, 2004

(51) Int. Cl.
| G06F 12/00 | (2006.01) |
| G06F 13/00 | (2006.01) |
| G06F 13/28 | (2006.01) |
| G06F 11/00 | (2006.01) |
| G06F 17/30 | (2006.01) |
| G06F 9/00 | (2006.01) |
| G06F 9/24 | (2006.01) |
| G06F 15/177 | (2006.01) |

(52) U.S. Cl. ............... 711/165; 711/161; 711/162; 714/2; 714/4; 714/6; 707/202; 707/204; 713/1; 713/2

(58) Field of Classification Search .......... 711/165
See application file for complete search history.

(56) References Cited

U.S. PATENT DOCUMENTS

| 5,649,152 A | 7/1997 | Ohran et al. |
| 5,835,953 A | 11/1998 | Ohran |
| 5,905,990 A | 5/1999 | Inglett |
| 6,618,736 B1 | 9/2003 | Menage |
| 6,665,815 B1* | 12/2003 | Goldstein et al. .......... 714/20 |
| 7,024,527 B1* | 4/2006 | Ohr ......................... 711/161 |
| 7,032,107 B2* | 4/2006 | Stutton et al. ............... 713/2 |
| 2003/0177324 A1* | 9/2003 | Timpanaro-Perrotta ..... 711/162 |
| 2004/0003314 A1* | 1/2004 | Witt et al. ................... 714/6 |

OTHER PUBLICATIONS

Langan, David. A Methodology for Fast PC Hard Disk State Restoration. 1992. ACM.*

* cited by examiner

*Primary Examiner*—Brian Peugh
*Assistant Examiner*—Ryan Bertram
(74) *Attorney, Agent, or Firm*—Bardmesser Law Group

(57) ABSTRACT

A server is restored by creating an image of a local drive of a server; replacing a driver in the boot up procedure of the server, the replacement driver redirecting disk drive access requests from the local drive to the image; on-demand copying portions of the operating system needed for start up from the image to memory of the server; and copying a remainder of the image from the image to the local drive as a background process. The data is copied on-demand from the image to the local drive. The copying is performed over a network. The image is created on a different server connected to a network. The copying of the remainder of the image, after critical start-up data has been copied, is done based on a priority of a sector of the image being copied. A bitmap is created corresponding to sectors of the image, and the server decides whether to access a particular sector on the local drive or on the image based on the bitmap.

37 Claims, 7 Drawing Sheets

SYSTEM AND METHOD FOR RAPID RESTORATION OF SERVER FROM BACKUP

BACKGROUND OF THE INVENTION

1. Field of the Invention

The present invention is related to restoration of a computer system from backup, and more particularly, to a rapid restoration of a server from an image stored on a network. The present invention is also related to rapid restoration of local hard drives from a network, or from the Internet.

2. Related Art

With the popularity and success of the Internet, server technologies are of great commercial importance today. An individual server application typically executes on a single physical host computer, servicing client requests.

In conventional systems, the data of the server is typically backed up on some storage device in the form of backup files. If the server crashes or fails, or the software becomes corrupted, it may become necessary to restore the state of the server to some previously backed-up state. The process consists of three steps: (1) the machine is usually physically shut down; (2) The data is copied from the backup storage to the storage, e.g., disk drive, used by the server. During this operation, a dedicated boot procedure can be used (for example, boot from a floppy disk); and (3) the server is restarted.

During the restart time, the server does not perform any useful functions. Also, the process of restoring all the files of the server is time consuming. In corporate networks, a typical server can have 100 Gigabytes (or, frequently, much more than that) of data. With a transfer rate up to 100 Megabytes per second over a network, it would take approximately 1,000 seconds to transfer all the data from the backup storage to the server as local storage. This assumes that the entire network bandwidth is available for this process. Frequently, this is not the case, since only a fraction of the bandwidth may actually be available at any given time for restoring the files from backup. In practice, such transfers of data from backup to the server can take many hours.

Also, even 1,000 seconds of downtime is an extremely long time, particularly for many mission-critical applications. For example, if the server in question is a web server that handles customer requests or sales, a period of 16-20 minutes of downtime can result in substantial lost sales. Furthermore, it is generally believed that for many e-commerce applications, the consumer attention span is relatively short, and a customer that does not receive a rapid response from a web server will simply go to a competitor's website. In other words, there is a need in the art to minimize server downtime during backup, avoid network overloading during the restoration process, and to provide a mechanism to rapidly recover a server after a failure or shutdown.

SUMMARY OF THE INVENTION

Accordingly, the present invention is related to a system and method for rapid restoration of a server from backup that substantially obviates one or more of the disadvantages of the related art.

In one aspect, there is provided a method of restoring a server, including creating an image of a local drive of a server; replacing a driver in the boot up procedure of the server, the replacement driver redirecting disk drive access requests from the local drive to the image; on-demand copying portions of the operating system needed for start up from the image to memory of the server; and copying a remainder of the image from the image to the local drive as a background process. The data is copied on-demand from the image to the local drive. The copying can be performed over a network. The image is created on a different server connected to a network. The copying of the remainder of the image, after critical start-up data has been copied, can be done based on a priority of a sector of the image being copied. A bitmap is created corresponding to sectors of the image, and the server decides whether to access a particular sector on the local drive or on the image based on the bitmap.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings.

The present invention is related to a utility for server backup that works on a data block level. The use of data block-based backup, rather than file-based backup, permits rapid restarting of the server from the backup data, usually referred to as an "image."

Figure 1:
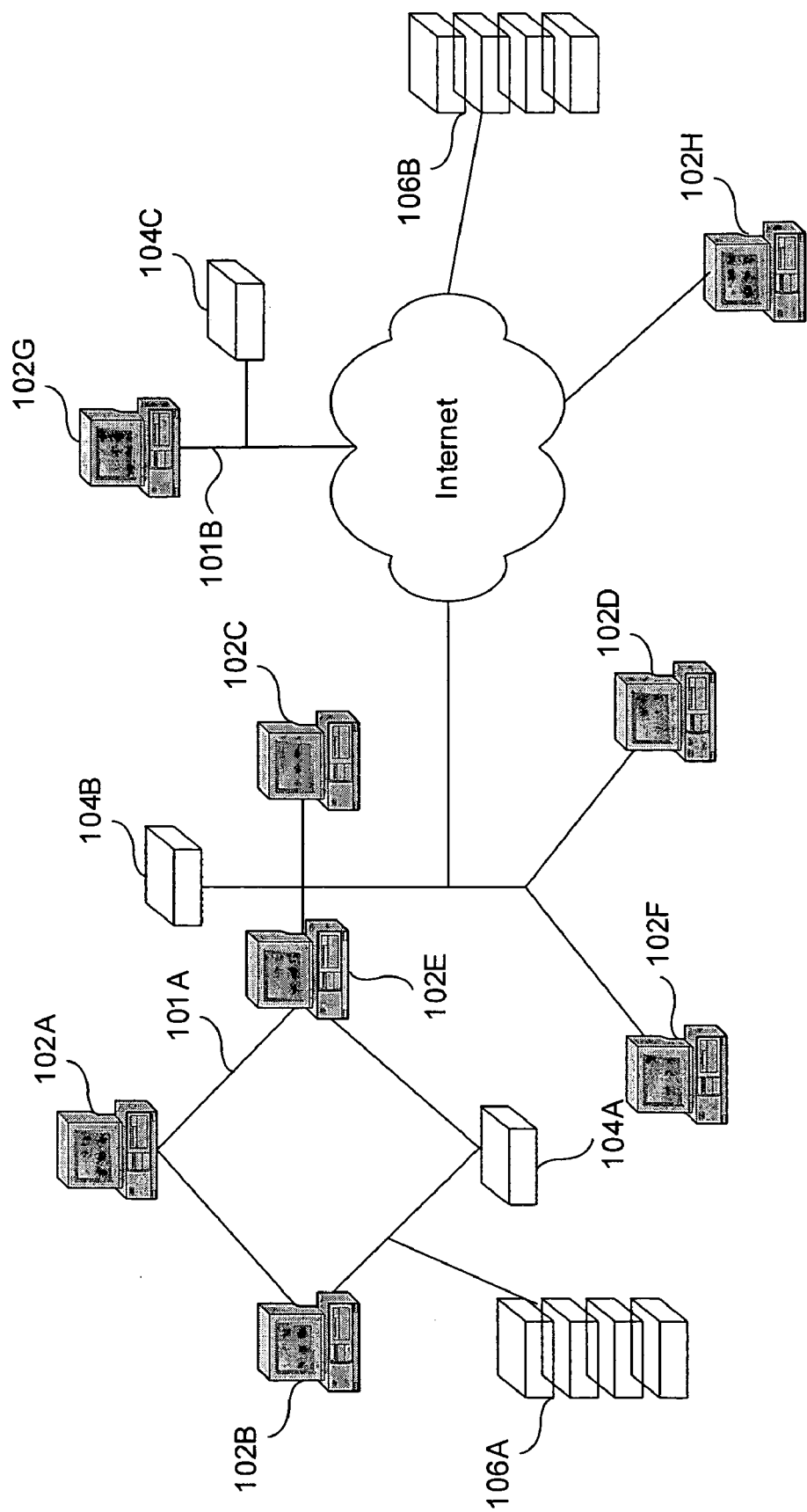
FIG. 1 illustrates an example of a network that may be used in the present invention.

FIG. 1 illustrates an example of a network that includes a server that needs to be restarted. Shown in FIG. 1 are a number of servers 102A-102H, connected to each other using such known means as a local area network (LAN) 101A, 101B, the Internet, a Wide Area Network (WAN), or some combination thereof. For purposes of this discussion, server 102A is used as an example of a server that is being restarted. Also included in the network are storage elements 104A-104C and RAIDs (redundant arrays of independent disks) 106A, 106B. The data of the server 102A can be backed up on another server (e.g., server 102B), or on a storage device, such as 104 or 106. Although in this discussion, the storage generally at issue is usually a hard disk drive, or HDD, it will be understood that the invention is not limited to that particular storage medium, but other storage media can be used for creating the image, such as tape, flash drive, optical drive, etc. It should be noted that the present invention is less applicable for use with storage media that have sequential access, or for archiving on devices that use sequential access, such as tapes, although the invention is nonetheless applicable to this situation. In the case of storage devices that use sequential access, it is preferred to create an image on some intermediate carrier of information (or some storage device) that has random access capability.

The present invention is designed to restart the server 102A directly from the backed up data (generally referred to as an "image"), without having to wait for the full transfer of the backed up data back to the local storage of the server 102A, from some available network storage.

The backed up data can include a partition that relates to the operating system, or it can include data that the server uses for its operation, without which the server 102A cannot perform useful activities, or both. Unused blocks and blocks with defects can be ignored when an archive is created, and are not restored in the future, when the restoration process takes place. For example, in the file system FAT32, this task is solved by an appropriate analysis of the FAT (File Allocation Table), and similar solutions can be applied to other file systems, such as FAT16, and TFS, NTFS, EXT3, and XFS.

It should be noted that from the moment that the restoration of data from backup begins, whatever data exists on the server's own hard drive can no longer be considered valid. Note also that the backup may be a full backup, or it may also be an incremental snapshot of some of the files, etc. Generally, it is assumed that there is little point in doing an incremental backup or an incremental snapshot if doing the incremental backup is little different from doing a complete backup, since the overhead for doing incremental backup is higher than for a "regular" backup.

For purposes of the present discussion, it is assumed that whatever image exists in the backup storage, that image represents valid data, and that the server 102A, if restarted from that image, will function properly. For purposes of further explanation, it may be necessary to use not just the latest image, but some other image, which was created previously, if it is believed that the latest image does not represent valid data. However, it is assumed that there is at least one image available somewhere, that can be used for data restoration of the server 102A, and which represents valid data.

It should be noted that not only a copy or an archived copy of the disk of the server that is being restored can be used as an image, but any other disk can be used as well. For example, in the present invention, it is possible to swap the working contents of disk drives of working servers. Also, it is possible to duplicate servers, when the capabilities of the particular servers are inadequate to perform their assigned tasks due to overload.

For purposes of further illustration, the following describes the start up in a conventional operating system, for example, Windows NT. Using a BIOS (Basic Input/Output System), the hardware sends a request to a predefined data storage device (usually a local hard drive), which contains a Master Boot Record (MBR). The Master Boot Record in turn contains instructions for organizing the file system, loading the initial elements of the operating system into memory, etc. Then, device drivers are launched, and the operating system starts functioning, in the usual manner. For purposes of the present discussion, the problem is that the entire process described above with reference to the conventional operating system expects to find the data that it needs for startup at a certain spot on the local hard drive. The data that it finds at that predetermined location must be correct, and must be where the hardware expects to find it. If the Master Boot Record is "broken" (or contains errors) then the startup will fail. In other words, in order to launch the system (see, for example, U.S. Pat. No. 5,930,824, which is incorporated by reference), it is necessary first to copy, at a minimum, a set of data that is necessary for system start, from the image, onto the local hard drive. After that, the operating system is loaded into memory. Another difficulty that needs to be overcome is that the original image might not contain the means for an on-demand restoration of lost data from the original image. This makes it impossible, in some cases, to restore the hard drive from an image "as is."

The reduction in server downtime, and a significant simplification in the restoration procedure is accomplished by use of an MBR, which ensures the completion of a loading procedure with the use of a special (dedicated) driver. The dedicated driver forms a virtual hard drive using an image of the restored disk and ensures addressing of applications to the virtual drive, which corresponds to the original (source) disk drive. Restoration of the disk sectors is on-demand, rather than by restoring the entire disk of the server 102A from an image. In other words, the order of the sector restoration is changed, or prioritized, to enable the server 102A to start up quickly, without waiting for the entire disk image to be transferred.

In the present invention, the first data that is copied from backup is the data that is necessary for the system to start up. At first, system start is used with utilization of special procedures, which are different from standard procedures used in the original drive. The operating system of the server 102A itself can determine which sectors are necessary. The operating system on the server 102A determines the priority of the on-demand restoration.

Upon startup of the server 102A, and once the initial code of the operating system is loaded, the operating system then can determine which sectors it needs next, and can restore those sectors at that time. The data is taken not from the local HDD, which contains presumptively invalid data, but from the image of the HDD. Also, the operating system keeps track of which disk sectors have been restored, and which have not. Subsequently, a utility is launched that will transfer the rest of the disk image according to its own set of priorities (e.g., priorities of the operating system or of the utility).

It is generally assumed that only a relatively small subset of the total data on the image is actually necessary to enable startup and (at least) initial functionality of the server 102A. The rest of the image can be transferred gradually over time, depending on the need for the data and the network resource availability.

In other words, this procedure enables a fast startup of the server 102A from a backup image, without having to wait for tens of minutes or even hours, for the entire image to be transferred. This means that the downtime of the server 102A is essentially not much more than the physical startup time of the server 102A (plus some additional, but relatively minor, time that it takes to copy the most critical parts of the image).

The amount of such critical startup data, in most modern servers, is generally on the order of about 100 MB or less, which means a transfer time on the order of 10-20 seconds.

Note also that the 10-20 seconds needed for transferring the initial critical start up data is in parallel with the actual physical startup of the server and initial operating system loading into memory. This further reduces the actual downtime experienced by the server 102A due to the restoration from backup.

Another advantage of this approach is that it permits online migration of a server with minimal downtime. For example, once the data is backed up, it can be used for startup of a different server (e.g., 102C), and the original server 102A can be shut down.

Also, in the case of online migration, the order of creating the disk image can be optimized and prioritized in the same manner, so as to enable startup of the second server 102C while the rest of the data is being migrated over time.

Figure 2:
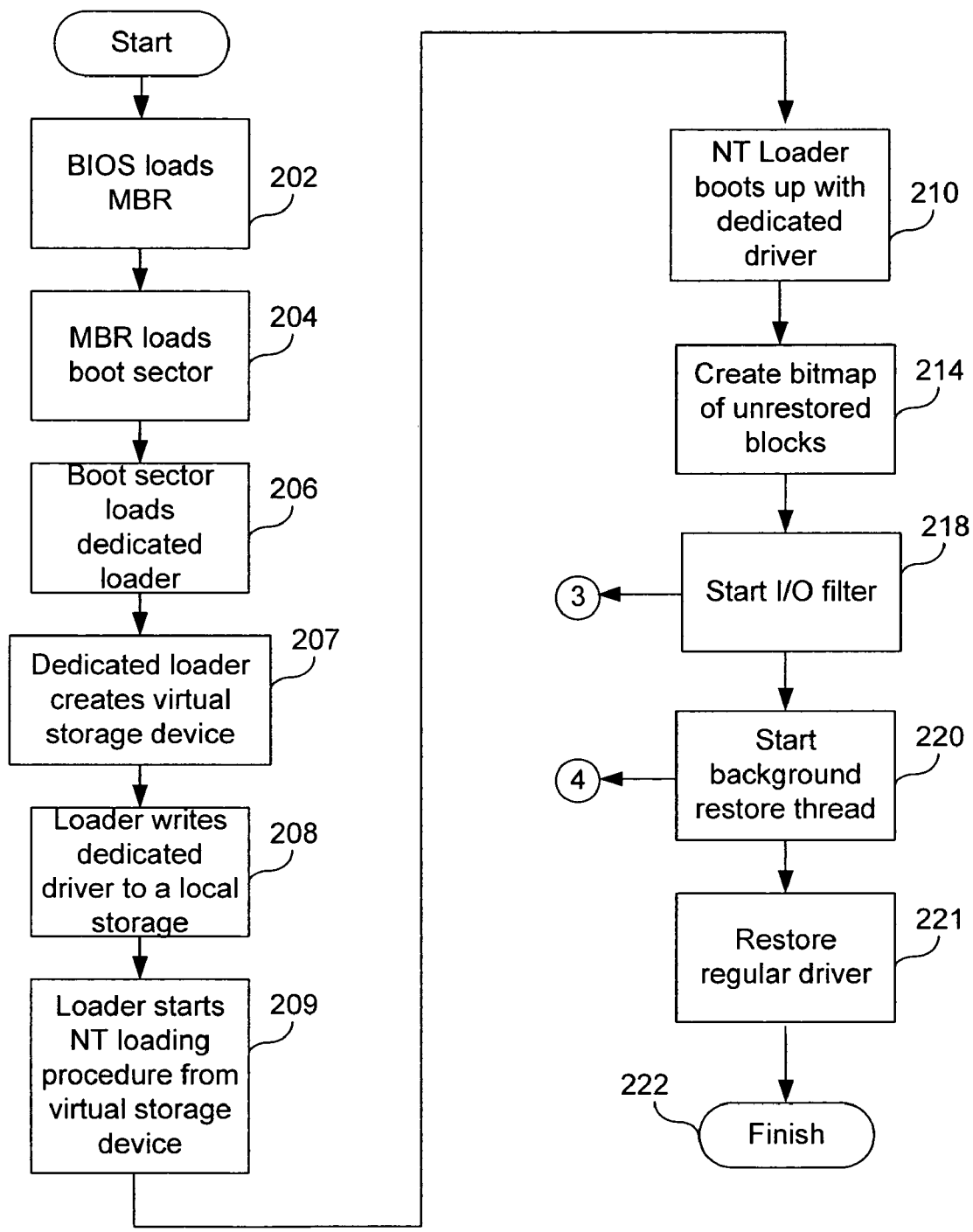
FIG. 2 illustrates one embodiment of the present invention.

FIG. 2 illustrates one embodiment of the present invention. Note that in FIG. 2, steps 218 and 220 also start asynchronous processes ③ and ④, illustrated in FIG. 3 and FIG. 4, respectively, that can run in parallel with the process shown in FIG. 2.

Before the storage device restoration can be done, an image of the storage device, e.g., of a disk drive, must be created. The image of the disk drive that have been backed up is created, for example, on a hard disk drive, or on another node on the network, or on another server, etc. Creation of a disk image generally means not merely copying of data from a "real" drive (which is later restored), but also formation of a disk which can be used as an image when the server or computer system is started (for example, a server or a desktop computer) that was previously not being used.

For example, if the server 102A had been previously shut down and is being restored, then the machine in question is the same physical machine. If the server in question is a server to which migration is being effected (102C in the above discussion), then the replaced Master Boot Record is loaded onto that physical machine. In other words, the machine being started up is the machine that corresponds to the virtual HDD.

For initial boot up procedure, a different partition of the same disk can be used, or a different storage device, for example, a network drive, such as a SAN (storage area network) disk. Also, the same physical disk drive can be used, on which an appropriate boot up area has been created. In the latter case, for replacing disk e.g., a damaged disk, or for restoration of a server on a new disk drive, the procedure can be done in a hot swapping regime, with the use of a disk on which a system boot-up area has been created. In the process of restoration, system information can be replaced with corresponding system information from the image.

An image of a partition can include all of the sectors of that partition, and also of operating system areas. The procedure that identifies disk sectors that are subject to archiving and, correspondingly, to a subsequent restoration through the use of a bitmap, should preferably be performed at the stage of creation of the archive.

As shown in FIG. 2, the dedicated driver being loaded to mount virtual storage drive (virtual HDD) during the boot up and operating system startup procedures.

For performing such operations, a bootable device with special MBR and/or boot sectors may be used to load a dedicated driver. Also, the "standard" OS driver may be replaced by a dedicated driver before starting restore operations, if the partition under restoration is other than the system partition.

Additionally, executing the boot-up procedure with a dedicated driver can be performed by updating the BIOS settings in the memory of the restored server, e.g. for starting the server from dedicated bootable device.

In step 202, the system on which the virtual HDD is to be mounted is booted up, and a replacement Master Boot Record is loaded by the BIOS. The Master Boot Record, among other things, contains information about disk partitioning. Also, on a desktop computer, the Master Boot Record defines the existence of, for example, physical drives A, B, C, D, E, etc.

In step 204, the MBR loads the boot sector into memory. The boot sector is specific to a particular hard drive and describes how that hard drive is divided into sectors. The boot sector is, in effect, a "truncated" version of an operating system that is capable of accessing storage, such as hard drives, and which in turn will later enable the loading of the rest of the operating system into memory. Note that the description herein regarding steps 202-210 is applicable to the Intel X86 architecture. Other processor architectures and operating systems have slightly different approaches, although the general principle is essentially the same, and are intended to be covered by this description.

In step 206, the boot sector bootup results in loading a dedicated (substituted) loader procedure (driver). In step 207, the loader replaces the hooks relating to interrupt 13, which handles disk access requests. In other words, by substituting a new interrupt handling routine for the standard one, the system will be able to use the virtual HDD. From the perspective of the hardware, the virtual HDD will be treated as if it were an integral local hard drive.

Moreover, through known mechanisms, a virtual storage device of the server 102A is created and, from that point on, all updates would be directed to that virtual storage device. Also, the driver used for interfacing to the disk drive is updated accordingly. For example, if an ATAPI driver is used, that driver is updated to now refer to the appropriate virtual HDD, instead of the local HDD of the server 102A. The objective is to ensure that upon startup, any disk access request is performed not directly on the local HDD, but through an intermediate procedure (and ultimately on the virtual HDD).

The virtual HDD in some sense corresponds to the original HDD of the server 102A (or, optionally to only certain partitions of it). Another way of viewing this is that this procedure ensures that disk drive I/O is addressed correctly, to the virtual HDD rather than to the local HDD or some other "incorrect" storage device.

For performing subsequent startup operation using the dedicated driver, such a driver, e.g., atapi.sys may be saved (step 208) to the local storage. The local storage will receive the regular driver requests for access. The operating system boot up procedure should be redirected to the local drive. The backup image itself can also be modified to provide smooth access of the server OS that needs to be restored to the virtual HDD. This can be done, for example, by replacement of an appropriate atapi.sys driver in Microsoft Windows version inside the backup image to a newer version, prior to starting the restoration procedure.

The dedicated loader then transfers control (step 209) to a routine defined by MBR and boot sectors of the virtual keeping in mind that dedicated driver should be loaded instead of regular driver. As a result, the operating system then booted from the virtual HDD. Next, in step 210, the loader loads any boot drivers (for example, such as those used for the Windows NT, or Windows XP operating systems) from the image and the dedicated driver from the HDD.

In step 214, a bitmap of the sectors of the virtual HDD that have to be restored is created. In other words, the bitmap represents which of the sectors have to be copied from the virtual HDD to the real local HDD, since the objective is not to merely start up the machine, but also to copy the image of the hard disk from the backup to the actual physical (local) HDD used by the server 102A. Using the bitmap, upon a disk access request, it is determined whether the particular sector that is being accessed has already been copied to the real hard drive or updated during operation of the computing system (and therefore can be used in local storage), or whether the corresponding sector is still located on the backup device, in the virtual HDD, and therefore still needs to be copied. The access can be executed using a storage area network, a local area network or any other mechanism available for accessing remote storage. Since the dedicated driver is now resident in the memory, corresponding blocks of the image should be marked in the bitmap for complete restoration of the storage device.

Figure 3:
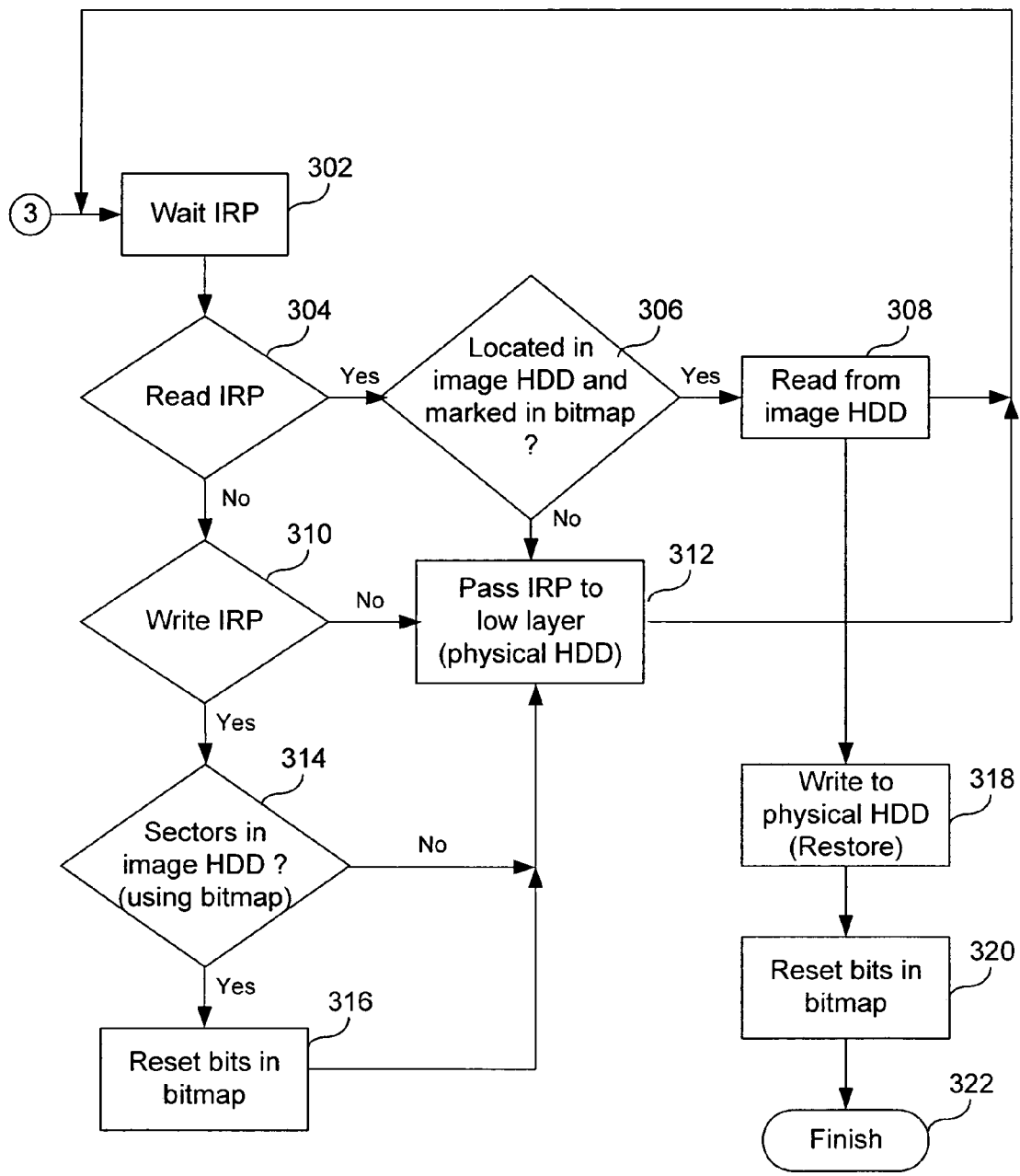
FIGS. 3-4 illustrate additional detail of the asynchronous data copying processes used in the present invention.

Step 218 starts asynchronous process ③, which is illustrated in FIG. 3, and which determines which I/O devices, physical devices, such as disk drives, disk partitions, logical drives or logical partitions, or their combinations, need to be accessed. Applications address the Virtual HDD as a single address space, although the processing of the requests may require readdressing of the requests to either the disk being restored or the disk image, based on the procedures discussed below.

Figure 4:
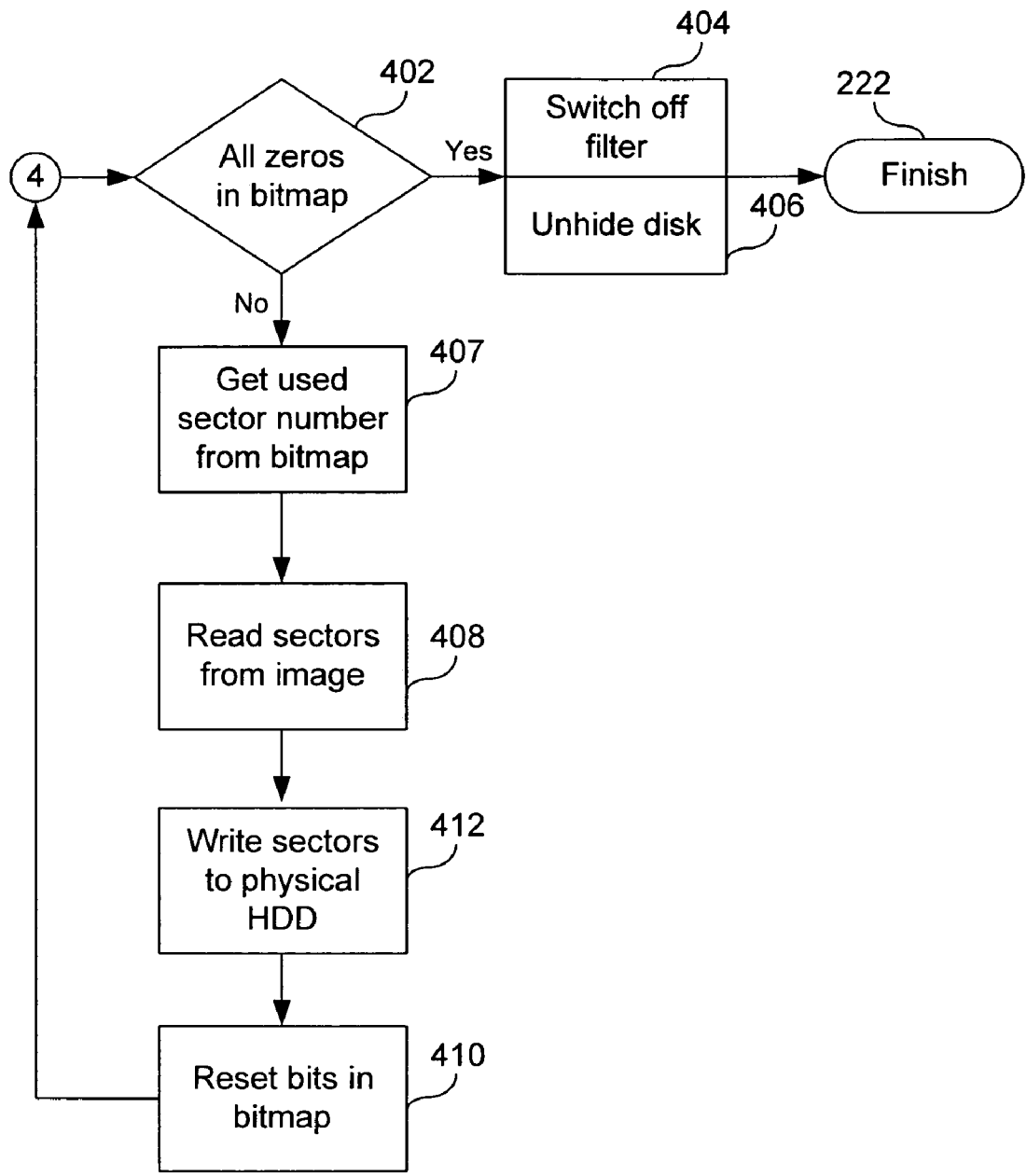

Also, an asynchronous restore thread is started in step 220, which is illustrated in FIG. 4 and is designated by ④. The process then finishes (step 222). Note also that after step 214 execution, the existence of the local HDD has been hidden from the operating system. Thus, all disk access requests go to the virtual HDD. This is done to avoid a situation where there are two storage elements that contain "actual" data, and which in theory could conflict with each other.

After finishing processes ③ and ④, the dedicated driver may be replaced by the regular operating system driver, e.g., for direct access of the corresponding memory, or the system may be restarted by the standard procedure from the restored drive.

FIG. 3 illustrates the process of accessing data from a virtual HDD. As shown in FIG. 3, an interrupt request packet (IRP) is received. In step 304, the IRP is processed. Note that the IRP is a Windows operating system concept. More generally, in the context of other operating systems, it may be thought of as a request for a read/write operation, in this case involving storage.

If the IRP is a READ request (READ IRP), then, in step 306, the system checks whether the sector being accessed can be located on the image HDD using the bitmap. If it can be located on the image HDD, then, in step 308 the sector is read from the image HDD. If it cannot be located on the image HDD, then in step 312, the IRP is passed on to a lower hardware layer (in other words to the physical HDD). Note that physical disk at issue here can be a logical construct, for example, software or hardware-supported RAID partition, disk image in a file or an encrypted disk image.

If, in step 310, the IRP is neither a READ or a WRITE IRP, then the IRP is passed to the lower layer (the physical or local HDD) in step 212. Examples of IRPs that are neither READs nor WRITEs are, for example, Get Disk Layout IRP's in the Microsoft Windows scheme. If the IRP is a WRITE IRP, then the process checks, in step 314, whether the sectors being accessed are in the image HDD. If not, then the IRP is passed to the lower layer, as in step 312. If it is in the image HDD and has not been restored previously, then the appropriate bits in the bitmap are reset, with blocks (clusters) being unmarked (step 316). In other words, if the READ IRP is directed to a sector that is currently located on the image HDD, the sector is copied from the image HDD to the real local HDD, and the data is actually read from the local HDD. As an alternative, the data can be copied into a cache, and read from the cache. Thus, in step 316, the system recognizes that it does not need to access the image HDD since the data is already present on a local hard drive. The process then proceeds to step 312.

Also, steps 318-322 characterize restoration of blocks that have been read from the image. The process includes writing corresponding blocks to local storage (physical HDD) (step 318), resetting corresponding bits in the bitmap (unmarking block) (step 320), and finishing after the last operation has being completed.

It should be noted that the bitmap should be maintained in a state that is consistent with the actual state of the HDD. It is the responsibility of the various processes that use the bitmap to ensure that the information in the bitmap is accurate, consistent and up to date (e.g., by freezing the processes that change the state of the HDD while the bitmap is being updated, or utilizing a special set of marks, etc.).

Another asynchronous process ④, illustrated in FIG. 4, handles the gradual (background) copying of the data from the virtual HDD to the local HDD. As shown in FIG. 4, the asynchronous process ④ first checks if the bitmap contains all zeros (step 402). If it does, then the I/O filter is switched off (step 404) and restoration procedure has been finished. Optionally, the local HDD is unhidden (step 406) and the asynchronous process ③ finishes. In other words, from this point forward, now that all the required data has been copied from the virtual HDD to the local HDD, the disk access can be to the local HDD, instead of the virtual HDD. The background process of the restoration can be executed in the absence of input/output operations and/or release of transmission channels.

Otherwise, the driver discussed with reference to bitmap initially created in step 218 performs the functions illustrated in FIG. 3.

If the bitmap has some marks, e.g., 1's (i.e., any sectors that are marked), then used sector number is read from the bitmap (step 407), and the corresponding sectors are gradually read from the virtual HDD (step 408). The corresponding bits in the bitmap are reset (step 410). The sectors are written to the local HDD (step 412). The process then cycles until all of the demanded sectors are copied, i.e., no marks (no 1's) in the bitmap are left.

Upon execution of the asynchronous processes of FIGS. 3 and 4, the system continues to function as if it has always functioned with the local HDD.

Furthermore, it will be appreciated that the background process illustrated in FIG. 4 can also be prioritized before it begins. In other words, it may be decided, a priori, that some of the sectors have higher priority than others, in the copying process. For example, certain applications' data, which are frequently used, may be copied first. Also, some databases, which are frequently used, may be copied before others. Other mechanisms known in the art may be employed for structuring the priority of each sector during the background copying process ④. For example, unrestored files of file groups that had been accessed in the previous N processor cycles (or minutes, or hours) may be restored before files of those file groups that had not been accessed for some predetermined period of time. Those file groups may be database file structures or whole folders accessed by the applications.

Figure 5:
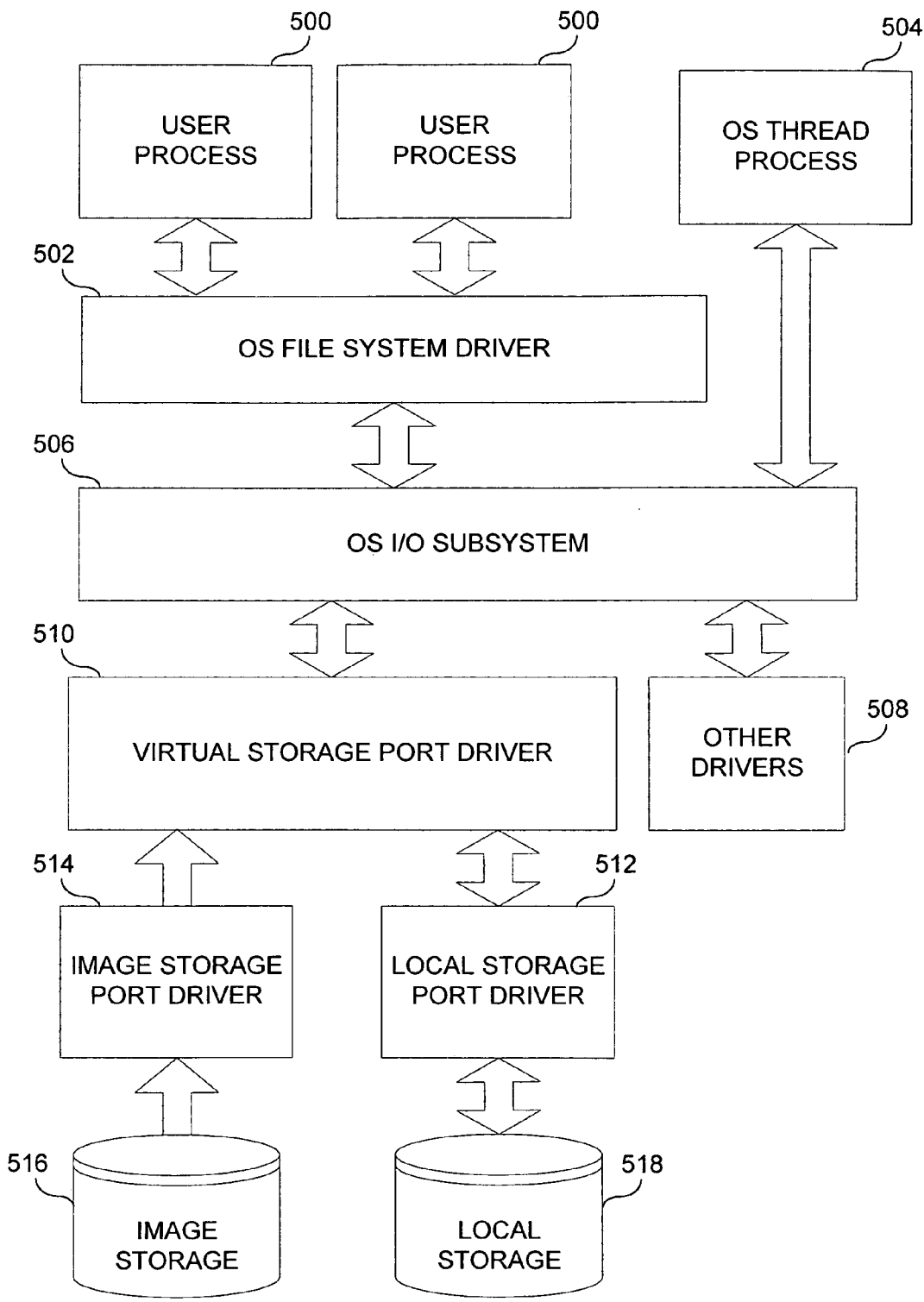
FIG. 5 illustrates an example of a data processing model during storage device restoration.

FIG. 5 is an illustration showing a computing system having a restoration procedure, in accordance with an embodiment of the present invention.

The computing system includes user processes 500 executing in an OS environment having a file system driver 502. Also, one or more OS thread processes 504 may be executed in parallel with user processes. An OS I/O subsystem 506 is in communication with the file system driver 502. The I/O subsystem 506 uses class driver to manage and deliver I/O requests to device drivers 508 and 510, that provide communication to corresponding devices: I/O ports (not shown), local area network controllers, image storage 516, local data storage 518 (flash or hard disk drives), etc.

Also, requests to local storage are managed during the restoration procedure by means of dedicated driver (virtual storage driver) 512 that addresses data, corresponding to requests via corresponding storage ports by use of storage port drivers selected by the result of bitmap checking.

Image storage 516 and local data storage 518 are hidden from the I/O subsystem 506 as physical drives and their content is accessed by the I/O subsystem as having an integral (unified) address space (including handling any issues with access requests for non-existent data). Also the image storage 516, during restoration procedure, may be accessed for read only access, while the local data storage 518 is random access storage.

After completion of the restoration procedure and removal of the virtual storage driver from the OS, the I/O subsystem 506 manages requests to local data storage 518, and, if needed, to the image storage 516 directly by means of image port driver 514 and local port driver 512.

Figure 6:
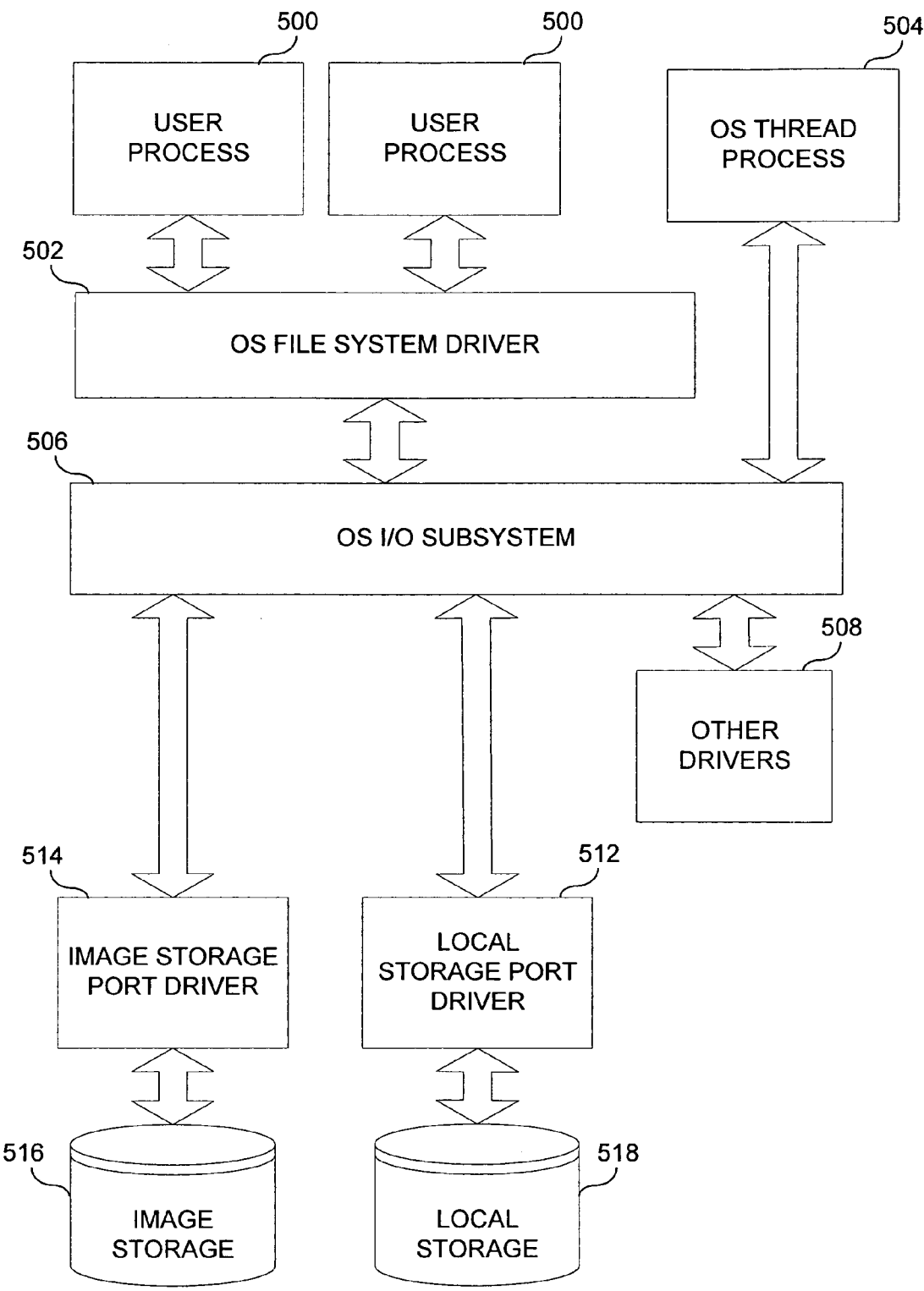
FIG. 6 illustrates an example of a data processing model after finishing a storage device restoration procedure.

FIG. 6 illustrates an example of a data processing model after the storage device restoration procedure is finished. Note particularly virtual storage port driver 510, which is used to intercept access requests to the standard drivers 512, 514 normally used by the operating system, as well as for organizing the virtual HDD (shown as a single structure, though it may actually be multiple storage elements). Once the restoration process is complete, the driver 510 is removed from the system. As a result, the local data storage 518 and the image storage 516 (e.g. network storage), after removal of the driver 510, are recognized by the operating system as distinct storage elements. Therefore, access requests to these devices are also processed based on standard procedures. At the same time, the restored local data storage 518 can be used in the same manner as virtual storage, while the image data storage 516, after removal of the driver 510, can then be maintained as a new storage element, or can stay hidden.

Figure 7:
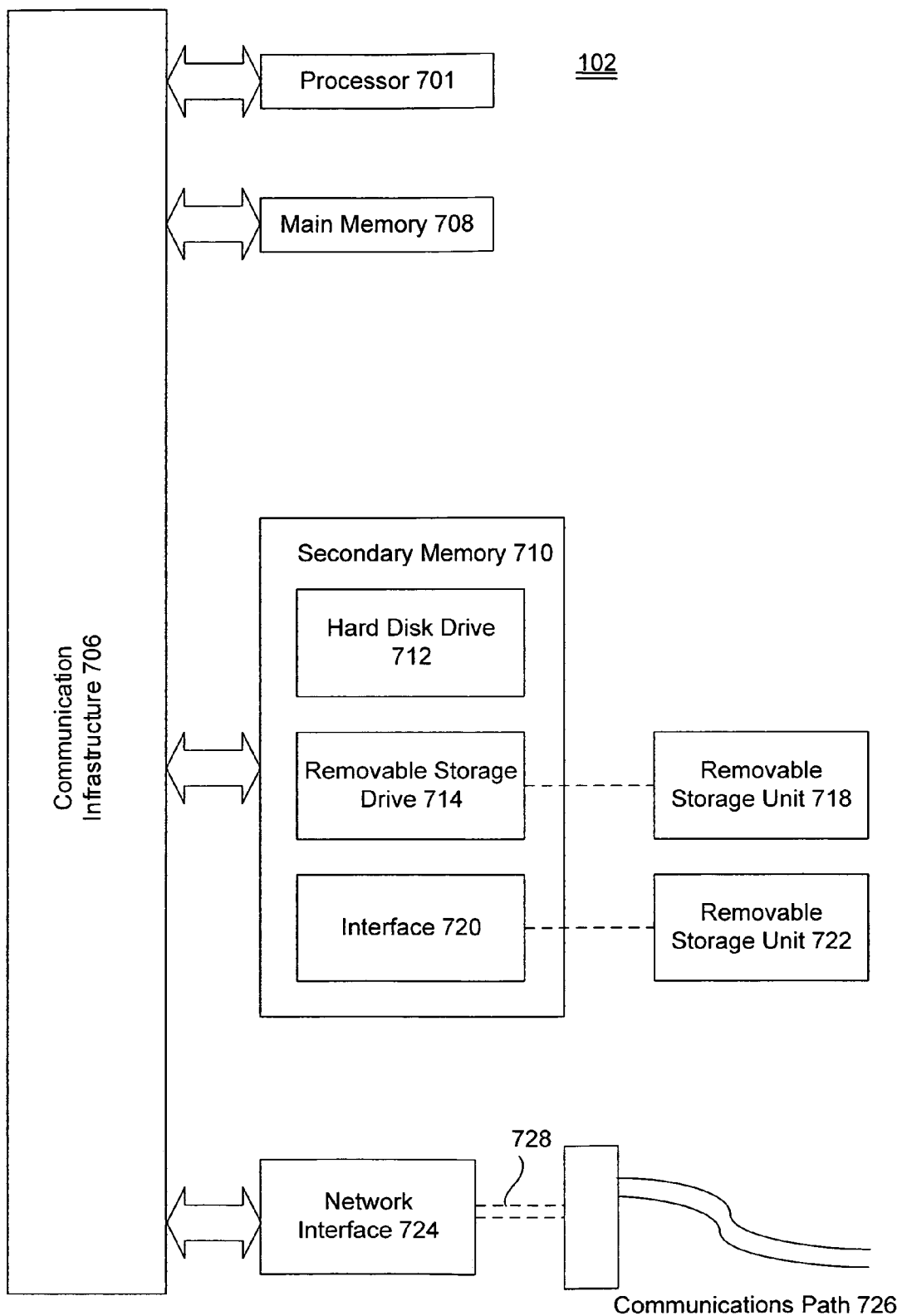
FIG. 7 illustrates an example of a server that may be used in the invention.

An example of the server 102 is illustrated in FIG. 7. The server 102 includes one or more processors, such as processor 701. The processor 701 is connected to a communication infrastructure 706, such as a bus or network. Various software implementations are described in terms of this exemplary computer system. After reading this description, it will become apparent to a person skilled in the relevant art how to implement the invention using other computer systems and/or computer architectures.

Server 102 also includes a main memory 708, preferably random access memory (RAM), and may also include a secondary memory 710. The secondary memory 710 may include, for example, a hard disk drive 712 and/or a removable storage drive 714, representing a magnetic tape drive, an optical disk drive, etc. The removable storage drive 714 reads from and/or writes to a removable storage unit 718 in a well known manner. Removable storage unit 718 represents a magnetic tape, optical disk, or other storage medium that is read by and written to by removable storage drive 714. As will be appreciated, the removable storage unit 718 can include a computer usable storage medium having stored therein computer software and/or data.

In alternative implementations, secondary memory 710 may include other means for allowing computer programs or other instructions to be loaded into server 102. Such means may include, for example, a removable storage unit 722 and an interface 720. An example of such means may include a removable memory chip (such as an EPROM, or PROM) and associated socket, or other removable storage units 722 and interfaces 720 which allow software and data to be transferred from the removable storage unit 722 to server 102.

Server 102 may also include one or more communications interfaces, such as communications interface 724. Communications interface 724 allows software and data to be transferred between server 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. This channel 726 carries signals 728 and may be implemented using wire or cable, fiber optics, an RF link and other communications channels. In an embodiment of the invention, signals 728 comprise data packets sent to processor 701. Information representing processed packets can also be sent in the form of signals 728 from processor 701 through communications path 726.

The terms "computer program medium" and "computer usable medium" are used to generally refer to media such as removable storage units 718 and 722, a hard disk installed in hard disk drive 712, and signals 728, which provide software to the server 102.

Computer programs are stored in main memory 708 and/or secondary memory 710. Computer programs may also be received via communications interface 724. Such computer programs, when executed, enable the server 102 to implement the present invention as discussed herein. In particular, the computer programs, when executed, enable the processor 701 to implement the present invention. Where the invention is implemented using software, the software may be stored in a computer program product and loaded into server 102 using removable storage drive 714, hard drive 712 or communications interface 724.

The present invention loads critical portions of the backed up operating system quickly, in order to enable the server to boot up directly from the backed up data, to minimize server downtime. It will be appreciated that the present invention may be used not only for restarting a server, but also for online data migration. The server that is being restarted need not be the same server, but maybe any server connected to the network.

It should be noted that a computer system to which the invention is applicable can include, for example, a desktop computer, a portion of whose disk drive is restored either from a different portion of the same local drive, from a different drive, from a network drive, etc. The computing system can also be a distributed computing system; a server that requires restoration or replacement of its disk drive after a critical failure; a server that is being brought online to replace or a server that has failed; or a server that is duplicating functions of another server, for instance, when that server is inadequate for the expected load.

The term "unexecutable requests" refers to requests that cannot be fulfilled by accessing the disk drive being restored. This is distinct from attempting to read or write to non-existent files, which is an operating system I/O issue. The read request is generally treated by operating system as being unexecutable if the corresponding block of the local drive is either corrupted or unrestorable.

It should also be noted that copying of data from the image to the computer system is not limited to mere transfer of the data. In this context, such copying should be thought of as reading of the data from the image and transferring the data to the computing system, including possible caching. Also, the "remainder of the storage device" (unaltered portions of remaining data) that can be restored from the image as a background process refers to all data in the image, except for the data and the sectors whose content has been changed during the process of execution of the restore, or by some application.

In the case of server duplication, a partition of a storage device of some server other than the computing system is preferably used as an image. The size of the partition image can be changed before or during restoration procedure, for example, resized to fit an actual size of a physical area of a disk on which it should be restored. Optimally, the image stays unchangeable until termination of the restoration process.

Various networks can be used for storing the image. For example, storage area networks, peer-to-peer networks, remote storage on a remote server, and virtual disk drives, such as network disk emulators, all can be used for storing the image.

The image can be created on at least one server that is connected to a network. Examples include a disk drive on a remote server, a network RAID array, storage area networks, or network streamers (magnetic or optical tape devices that requires serial, or streaming, data access). In the latter case, restoration of data that is not requested by applications is performed in the order in which the blocks are located on a particular magnetic tape. It should be noted that in the case of using a streamer, it is preferable to copy data onto a device with random access, since the use of a sequential access device significantly slows down execution of data requests from applications. An intermediate storage device may be used, together with the streamer, to speed up the restoration process.

Restoration of unaltered portions of the data (after the critical system data has been restored) can be done based on a pre-assigned priority of blocks of the image. Such assignment of priority of the blocks that have not been requested by the applications is generally a necessary and common-sense operation. However, in some cases, a particular prioritization scheme may increase the efficiency of the process. For example, the first data to be copied is data that is likely to be requested by the applications, or used by the operating system itself. Alternatively, or in addition to, this priority may be related to the physical nature of the devices. For example, blocks that belong to a single cylinder or sector can have a related priority.

In the description herein, the term "block" refers to any unit of information storage that is used by the operating system when addressing disk access requests to the hard drive, for example, a sector, a cluster or a file. Additionally, prior to starting the copying of the first block, it is preferable to create a bitmap of all the blocks that need to be copied to the restored disk. In the case of creating an incremental image, the bitmap should exclude blocks relating to deleted files.

It is also understood that rather than using a "regular" (or "standard") driver that includes standard operating system mechanisms for disk access, the present invention replaces some of these drivers with its own dedicated drivers.

Restored server identification and/or authentication data can be updated during the execution of the boot-up procedure. This is particularly necessary when portions of a disk drive are cloned while being used in the same system. The data being replaced can be, for example, UUID, URL, IP address, login, and/or password.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method of restoring a storage device, comprising:
   creating an image of the storage device;
   executing a boot up procedure of a computing system, including replacing a Master Boot Record and launching a dedicated driver, the dedicated driver redirecting unexecutable storage device read requests to the image;
   copying, from the image to the computing system, data needed for operation of the computing system;
   restoring portions of the storage device corresponding to the data from the image; and
   restoring unaltered portions of remaining data of the storage device from the image as an asynchronous background process.

2. The method of claim 1, wherein at least a partition of a storage device of a server other than the computing system is used as the image.

3. The method of claim 2, wherein restored server identification and/or authentication data is updated during boot up procedure execution.

4. The method of claim 1, wherein the image stays unchanged until termination of the restoration process.

5. The method of claim 4, wherein data corresponding to write requests to the image is backed up during the restoration process.

6. The method of claim 1, wherein the storage device is a local drive.

7. The method of claim 6, wherein one partition of the local drive is used as the storage device while another partition of the local drive is used as the computer readable bootable device.

8. The method of claim 6, wherein the local drive is a hard disk drive.

9. The method of claim 1, wherein the restoration is performed over a network.

10. The method of claim 1, wherein the image is created in at least one server connected to a network.

11. The method of claim 1, wherein the restoration of the unaltered portions of remaining data is done based on a preassigned priority of blocks of the image.

12. The method of claim 11, wherein the priority is preassigned under the condition of better performance of reading blocks from an image storage device.

13. The method of claim 1, further comprising creating a bitmap corresponding to blocks of the image, with unrestored blocks marked in the bitmap.

14. The method of claim 13, further comprising unmarking, in the bitmap, blocks being updated after a local drive write request execution.

15. The method of claim 13, further comprising unmarking, in the bitmap, the blocks being restored.

16. The method of claim 13, wherein the dedicated driver considers the storage device read request as unexecutable if corresponding block has been marked in the bitmap.

17. The method of claim 13, further comprising replacing the dedicated driver with a standard operating system driver after all the blocks have been unmarked in the bitmap, the regular driver servicing all local drive access requests.

18. The method of claim 1, further comprising restoring more than one storage device from the image.

19. The method of claim 1, wherein executing the boot up procedure with the dedicated driver comprises updating BIOS settings in a memory of the computing system.

20. The method of claim 1, further comprising a computer readable bootable device other then the storage device of the restored server being used for executing the boot up procedure.

21. The method of claim 1, wherein data transmission during the background process is executed as a low priority process.

22. The method of claim 1, wherein the restoration process also employs an incremental image.

23. A method of restoration of a storage device of a computing system comprising:
creating an image of the storage device;
executing a boot up procedure of the computing system, including replacing a Master Boot Record and launching a dedicated driver, the dedicated driver redirecting unexecutable storage device read requests to the image;
copying portions of data needed for operation of the computing system operation from the image to the computing system on an on-demand basis,
restoring parts of the storage device corresponding to the data from the image; and
restoring remaining data of the storage device from the image as an asynchronous background process.

24. The method of claim 23, wherein the image is created on at least one server connected to a network.

25. The method of claim 23, further comprising saving updated sectors as an incremental backup.

26. A computer program product for rapid restoration of a server, the computer program product comprising a computer useable medium having computer program logic recorded thereon for controlling at least one processor, the computer program logic comprising:
computer program code means for executing a boot up procedure including replacing a Master Boot Record and launching a dedicated driver, the dedicated driver redirecting unexecutable local drive read requests to a previously created image of a storage device of the server;
computer program code means for on-demand copying of portions of data needed for the server operation from the image to the server simultaneously with restoring parts of the storage device corresponding to the data from the image; and
computer program code means for restoring remaining data of the storage device from the image as an asynchronous process.

27. The computer program product of claim 26, further comprising computer program code means for activating the dedicated driver.

28. The computer program product of claim 26, further comprising computer program code means for adding sectors being updated to the image.

29. The computer program product of claim 27, further comprising computer program code means for replacing the dedicated driver with a standard operating system driver after all sectors have been unmarked in the bitmap, the standard operating system driver servicing all local drive access requests.

30. The computer program product of claim 26, further comprising computer program code means for updating server identification data during the boot up.

31. The computer program product of claim 26, further comprising computer program code for on-demand copying of portions of data needed for server operation from the image to the server simultaneously with restoring parts of the storage device corresponding to the data from the image.

32. The computer program product of claim 26, further comprising computer program code means for creating a bitmap corresponding to blocks of the image, and for marking unrestored blocks in the bitmap.

33. The computer program product of claim 32, further comprising computer program code means for unmarking bits in the bitmap blocks after a local drive write request execution.

34. The computer program product of claim 32, further comprising computer program code means for unmarking sectors being restored in the bitmap.

35. The computer program product of claim 26, further comprising computer program code means for adding sectors being updated to the image.

36. A system for restoring a server that includes a storage device comprising:
data storage means for storing an image of the storage device;
data processing means for:
executing a boot up procedure of the restored server to replace a Master Boot Record and launch a dedicated driver, the dedicated driver redirecting unexecutable local drive read requests to the image,
on-demand copying portions of data needed for the restored server operation from the image to the restored server simultaneously with restoring parts of the storage device corresponding to the data from the image, and
restoring remaining data of the storage device from the image as an asynchronous process;
transmission means for transmitting data in both directions between the storage device and the data storage means; and
transmission means for transmitting data in both directions between the data storage means and data processing means.

37. The system of claim 36, further comprising a computer readable bootable device, other then the storage device of the restored server, for storing the image.

* * * * *